US009565361B2

(12) United States Patent
Chou et al.

(10) Patent No.: US 9,565,361 B2
(45) Date of Patent: Feb. 7, 2017

(54) IMAGE CAPTURING DEVICE AND HYBRID IMAGE PROCESSING METHOD THEREOF

(71) Applicant: Altek Semiconductor Corp., Hsinchu (TW)

(72) Inventors: Hong-Long Chou, Hsinchu (TW); Yi-Hong Tseng, Hsinchu (TW); Huei-Shan Lin, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 0 days.

(21) Appl. No.: 14/881,178

(22) Filed: Oct. 13, 2015

(65) Prior Publication Data

US 2016/0337587 A1 Nov. 17, 2016

Related U.S. Application Data

(60) Provisional application No. 62/161,271, filed on May 14, 2015.

(30) Foreign Application Priority Data

Aug. 11, 2015 (TW) .............................. 104126020 A

(51) Int. Cl.
*H04N 5/232* (2006.01)
*H04N 9/07* (2006.01)
(Continued)

(52) U.S. Cl.
CPC .......... *H04N 5/23245* (2013.01); *H04N 5/265* (2013.01); *H04N 9/07* (2013.01); *H04N 9/43* (2013.01)

(58) Field of Classification Search
CPC ...... H04N 5/23245; H04N 5/265; H04N 9/07; H04N 9/43
See application file for complete search history.

(56) References Cited

U.S. PATENT DOCUMENTS 6,999,119 B1* 2/2006 Shibazaki .............. H04N 9/045
348/230.1
2003/0048493 A1* 3/2003 Pontifex ................ H04N 5/243
358/514
(Continued)

FOREIGN PATENT DOCUMENTS

CN 102480593 5/2012
JP 2011100426 5/2011

OTHER PUBLICATIONS

"Office Action of Taiwan Counterpart Application", issued on Aug. 26, 2016, p. 1-p. 5, in which the listed reference was cited.
(Continued)

*Primary Examiner* — Amy Hsu
(74) *Attorney, Agent, or Firm* — Jianq Chyun IP Office

(57) ABSTRACT

An image capturing device and a hybrid image processing method thereof are provided. The method is adapted to an image capturing device having a first lens and a second lens and includes the following steps. First, a scene is captured by the first lens and the second lens to respectively generate a mono image and a color image of the scene. Next, one of a mono image-based mode, a color image-based mode, and a color image-only mode is dynamically selected, and an output image is generated accordingly, wherein the mono image-based mode is to produce the output image by adding color image data onto the mono image, the color image-based mode is to produce the output image by adding mono image data onto the color image, and the color image-only mode is to produce the output image by only using the color image.

14 Claims, 3 Drawing Sheets

(51) Int. Cl.
*H04N 5/265* (2006.01)
*H04N 9/43* (2006.01)

(56) References Cited

U.S. PATENT DOCUMENTS

| | | | | |
|---|---|---|---|---|
| 2008/0073487 | A1* | 3/2008 | Brock | H04N 5/2254 250/208.1 |
| 2010/0316291 | A1* | 12/2010 | Deng | G06K 7/10544 382/166 |
| 2013/0038689 | A1* | 2/2013 | McDowall | G02B 27/0075 348/45 |
| 2013/0100311 | A1* | 4/2013 | Ogasahara | H04N 9/045 348/223.1 |
| 2014/0300721 | A1* | 10/2014 | Imamura | H04N 5/2256 348/77 |
| 2015/0281678 | A1* | 10/2015 | Park | H04N 5/23238 348/43 |
| 2015/0319347 | A1* | 11/2015 | Cottrell | G01S 17/107 348/81 |
| 2016/0014314 | A1* | 1/2016 | Laroia | G02B 5/201 348/273 |
| 2016/0014349 | A1* | 1/2016 | Peterson | H04N 5/23212 348/222.1 |
| 2016/0050354 | A1* | 2/2016 | Musatenko | H04N 5/2355 348/229.1 |

OTHER PUBLICATIONS

"Office Action of Taiwan Counterpart Application", issued on Apr. 12, 2016, p. 1-p. 5, in which the listed references were cited.

* cited by examiner

IMAGE CAPTURING DEVICE AND HYBRID IMAGE PROCESSING METHOD THEREOF

CROSS-REFERENCE TO RELATED APPLICATION

This application claims the priority benefit of U.S. provisional application Ser. No. 62/161,271, filed on May 14, 2015 and Taiwan application serial no. 104126020, filed on Aug. 11, 2015. The entirety of each of the above-mentioned patent applications is hereby incorporated by reference herein and made a part of this specification.

TECHNICAL FIELD

The disclosure relates to a hybrid image processing technique.

BACKGROUND

With development in technology, various smart mobile electronic devices, such as tablet computers, personal digital assistants and smart phones, have become indispensable tools for people nowadays. Camera lenses equipped in high-end smart mobile electronic devices provide same or better specifications than those of traditional consumer cameras, and some even provide three-dimensional image capturing features or near-equivalent pixel qualities to those of digital single lens reflex cameras. However, as opposed to slim design of mobile electronic devices, the sizes of lens modules and their sensing elements would inevitably increase for attaining high-quality and high-resolution images.

SUMMARY OF THE INVENTION

Accordingly, the disclosure is directed to an image capturing device and a hybrid image processing method thereof, which not only provide output images with high quality but also accentuate the slimness of the image capturing device.

A hybrid image processing method of an image capturing device, adapted to an image capturing device having a first lens and a second lens, is provided in the disclosure. The method includes the following steps. First, a scene is captured by using the first lens and the second lens so as to respectively generate a mono image and a color image of the scene. Next, one of a mono image-based mode, a color image-based mode, and a color image-only mode is selected dynamically according to a content of the scene so as to generate an output image. The aforesaid mono image-based mode is to produce the output image by adding color image data of the color image onto the mono image. The aforesaid color image-based mode is to produce the output image by adding mono image data of the mono image onto the color image. The aforesaid color image-only mode is to produce the output image by only using the color image.

According to an embodiment of the disclosure, the step of selecting one of the mono image-based mode, the color image-based mode, and the color mage-only mode dynamically according to the content of the scene includes obtaining depth range and depth variation of the scene according to the mono image and the color image and selecting one of the mono image-based mode, the color image-based mode, and the color image-only mode dynamically according to at least one of the depth range and the depth variation.

According to an embodiment of the disclosure, the step of selecting one of the mono image-based mode, the color image-based mode, and the color image-only mode dynamically according to at least one of the depth range and the depth variation includes as follows. Whether the depth range is greater than a distance threshold or the depth variation is less than a first depth variation threshold is determined. When the depth range is greater than the distance threshold or the depth variation is less than the first depth variation threshold, the mono image-based mode is selected. When the depth range is not greater than the distance threshold and the depth variation is not less than the first depth variation threshold, whether the depth variation is less than a second depth variation threshold is determined, where the second depth variation threshold is greater than the first depth variation threshold. When the depth variation is less than the second depth variation threshold, the color image-based mode is selected. When the depth variation is not less than the second depth variation threshold, the color image-only mode is selected.

According to an embodiment of the disclosure, the step of adding the color image data of the color image onto the mono image includes searching for a plurality of related color pixels from the color image, where the related color pixels are associated with luma pixels in the mono image, and combining related color data of the related color pixels into luma data of the luma pixels.

According to an embodiment of the disclosure, the step of adding the mono image data onto the color image includes searching for a plurality of related luma pixels from the mono image, where the related luma pixels are associated with color pixels in the color image, and combining related luma data of the related luma pixels into color data of the color pixels.

An image capturing device is also provided in the disclosure. The image capturing device includes a first lens, a second lens, a storage unit, and one or more processing unit. The storage unit is coupled to the first lens and the second lens and configured to store images captured by the first lens and the second lens. The processing unit is coupled to the first lens, the second lens, and the storage unit and includes multiple modules, where the modules include an image capturing module, a mode selecting module, and an image processing module. The image capturing module captures a scene by using the first lens and the second lens so as to respectively generate a mono image and a color image of the scene. The mode selecting module selects one of a mono image-based mode, a color image-based mode, and a color image-only mode dynamically according to a content of the scene. The image processing module generates an output image according to a mode selected by the mode selecting module, where the mono image-based mode is to produce the output image by adding color image data of the color image onto the mono image, the color image-based mode is to produce the output image by adding mono image data of the mono image onto the color image, and the color image-only mode is to produce the output image by only using the color image.

According to an embodiment of the disclosure, the mode selecting module obtains depth range and depth variation of the scene according to the mono image and the color image and selects one of the mono image-based mode, the color image-based mode, and the color image-only mode dynamically according to at least one of the depth range and the depth variation.

According to an embodiment of the disclosure, the mode selecting module determines whether the depth range is greater than a distance threshold or the depth variation is less than a first depth variation threshold. When the depth range is greater than a distance threshold or the depth variation is less than a first depth variation threshold, the mode selecting module selects the mono image-based mode. When the depth range is not greater than the distance threshold and the depth variation is not less than the first depth variation threshold, the mode selecting module determines whether the depth variation is less than a second depth variation threshold, wherein the second depth variation threshold is greater than the first depth variation threshold. When the depth variation is less than a second depth variation threshold, the mode selecting module selects the color image-based mode. When the depth variation is not less than the second depth variation threshold, the mode selecting module selects the color image-only mode.

According to an embodiment of the disclosure, when the mode selecting module selects the mono image-based mode, the image processing module searches for a plurality of related color pixels from the color image and combines related color data of the related color pixels into luma data of the luma pixels, where the related color pixels are associated with luma pixels in the mono image.

According to an embodiment of the disclosure, when the mode selecting module selects the color image-based mode, the image processing module searches for a plurality of related luma pixels from the mono image and combines related luma data of the related luma pixels into color data of the color pixels, where the related luma pixels are associated with color pixels in the color image.

In summary, in the proposed image capturing device and the hybrid image processing method thereof, dual lenses are used for capturing a mono image and a color image of a scene. An output image is generated by dynamically switching between the mono image-based mode, the color image-based mode, and the color image-only mode. Based on the advantages of a mono image and a color image in different scenes, the disclosure would adaptively switch to an image processing mode suitable for the current scene, which not only provide output images with high quality but also accentuate the slimness of the image capturing device.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications, which are obvious to one skilled in the art.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

Figure 1:
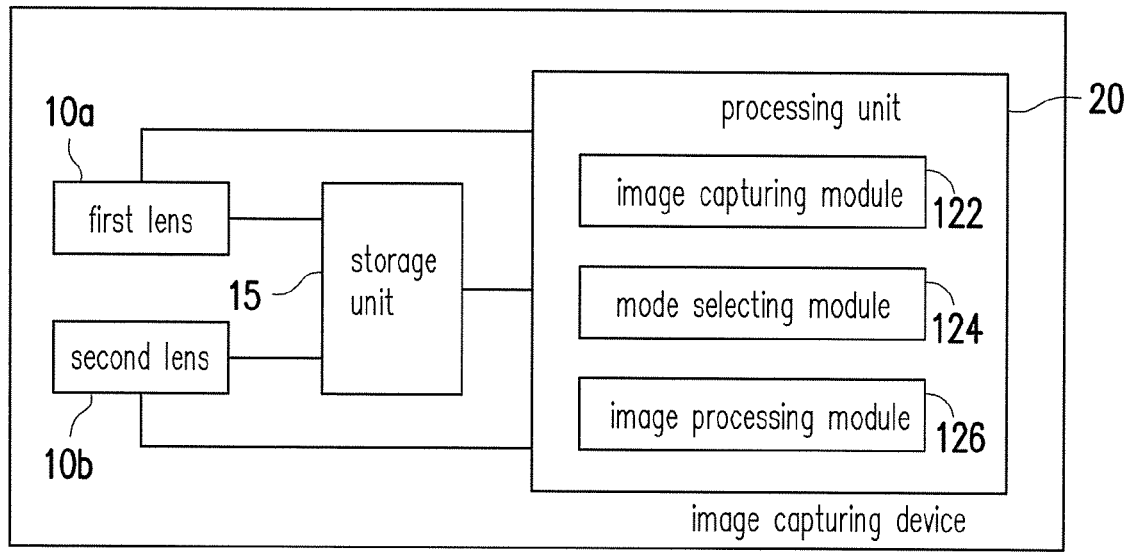
FIG. 1 illustrates a block diagram of an image capturing device according to an embodiment of the disclosure.

To make the above features and advantages of the application more comprehensible, several embodiments accompanied with drawings are described in detail as follows.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the invention.

FIG. 1 illustrates a block diagram of an image capturing device according to an embodiment of the disclosure. It should, however, be noted that this is merely an illustrative example and the invention is not limited in this regard. All components of the image capturing device and their configurations are first introduced in FIG. 1. The detailed functionalities of the components are disclosed along with FIG. 2.

Referring to FIG. 1, an image capturing device 100 includes a first lens 10a, a second lens 10b, a storage unit 15, and one or more processing unit 20. In the present embodiment, the image capturing device 100 may be a digital camera, a digital camcorder, a digital single lens reflex camera or other devices provided with an image capturing feature such as a smart phone, a tablet computer, a personal digital assistant, and so forth. The disclosure is not limited herein.

The first lens 10a and the second lens 10b include optical sensing elements for sensing light intensity entering the first lens 10a and the second lens 10b to thereby generate images. The optical sensing elements are, for example, charge-coupled-device (CCD) elements, complementary metal-oxide semiconductor (CMOS) elements, and yet the disclosure is not limited thereto. In the present embodiment, the first lens 10a is a black-and-white lens configured for capturing mono images (i.e. black-and-white images). The second lens 10 is a color lens configured for capturing color images.

The storage unit 15 may be one or a combination of a stationary or mobile random access memory (RAM), a read-only memory (ROM), a flash memory, a hard drive or other similar devices. The storage unit 15 is coupled to the first lens 10a and the second lens 10b for storing images captured thereby.

The processing unit 20 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processing unit 20 is coupled to the first lens 10a, the second lens 10b, and the storage unit 15, and includes, for example, an image capturing module 122, a mode selecting module 124, and an image processing module 126 for performing a hybrid image processing operation on images captured by the image capturing device 100. Detail steps of the hybrid image processing method performed by the image capturing device 100 would be illustrated by the embodiments as follows.

Figure 2:
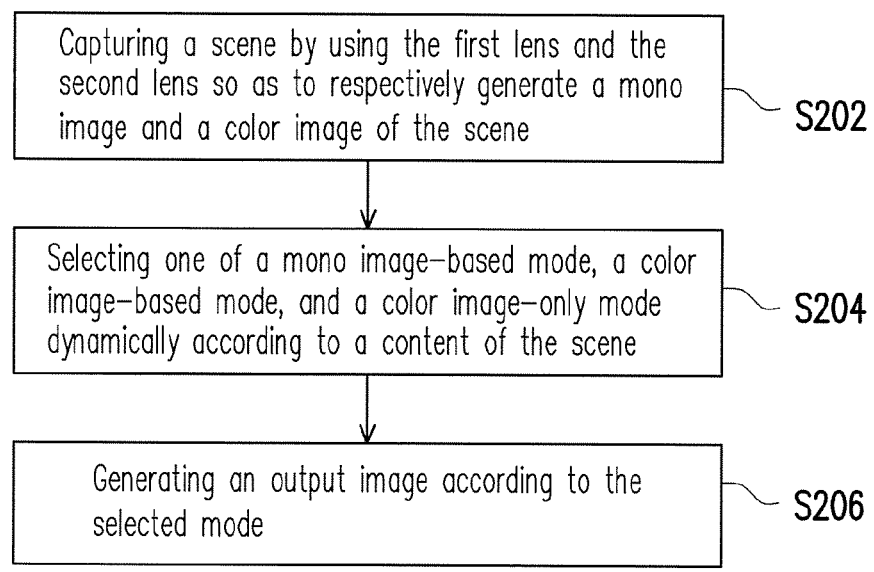
FIG. 2 illustrates a flowchart of a hybrid image processing method of an image capturing device according to an embodiment of the disclosure.

FIG. 2 illustrates a flowchart of a hybrid image processing method of an image capturing device according to an embodiment of the disclosure, and the method in FIG. 2 may be implemented by the components of the image capturing device 100 in FIG. 1.

Referring to both FIG. 1 and FIG. 2, the image capturing module 122 of the image capturing device 100 first captures a scene by using the first lens 10a and the second lens 10b so as to respectively generate a mono image and a color image of the scene (Step S202). In other words, when a user desires to capture an image of the scene by using the image capturing device 100, the image capturing module 122 would generate a mono image corresponding to the first lens 10a and a color image corresponding to the second lens 10b.

Next, the mode selecting module 124 selects one of a mono image-based mode, a color image-based mode, and a color image-only mode dynamically according to a content of the scene (Step S204), and the image processing module 126 generates an output image according to a mode selected by the mode selecting module 124 (Step S206). Herein, the mono image-based mode is to use the mono image as a primary image and the color image as a supplementary image, and the image processing module 126 produces the output image by adding color image data of the color image onto the mono image. On the other hand, the color image-based mode is to use the color image as a primary image and the mono image as a supplementary image, and the image processing module 126 produces the output image by adding mono image data of the mono image onto the color image. The color image-only mode is to only use the color image to produce the output image.

To be specific, the mono-based mode is suitable to preserve the brightness of texture details in a planar scene, whereas the color-based mode is suitable to preserve color schemes in a scene with mid-level depth variation. Hence, in the present embodiment, the mode selecting module 124 would adaptively select an image processing mode based on image data captured by the image capturing module 122 so as to allow the image processing module 126 to produce an image with decent quality. For example, FIG. 3 illustrates a flowchart of a hybrid image processing method of an image capturing device according to an embodiment of the disclosure, and the method in FIG. 3 may be implemented by the components of the image capturing device 100 in FIG. 1.

Figure 3:
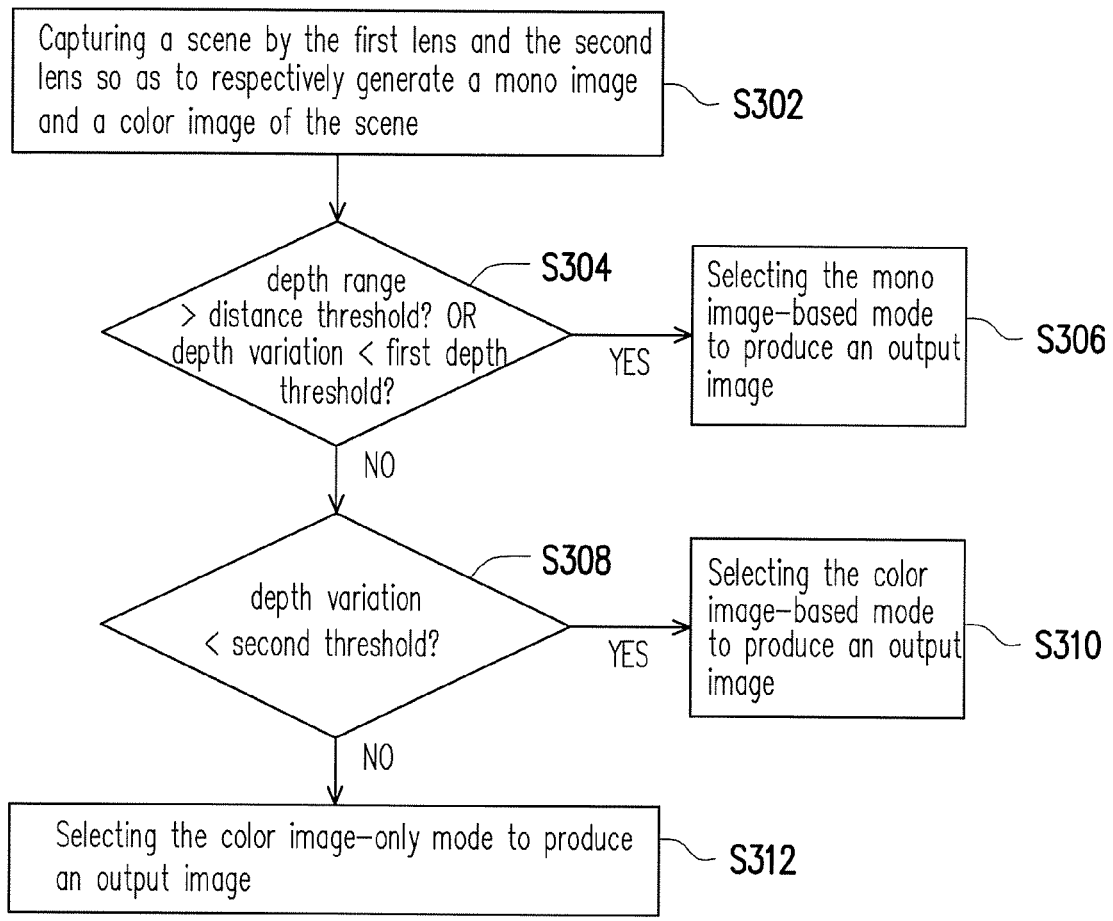
FIG. 3 illustrates a flowchart of a hybrid image processing method of an image capturing device according to an embodiment of the disclosure.

Referring to both FIG. 1 and FIG. 3, as in Step S202, the image capturing module 122 of the image capturing device 100 captures a scene by using the first lens 10a and the second lens 10b so as to respectively generate a mono image and a color image of the scene (Step S302). Since the first image 10a and the second image 10b capture images of the same scene from different viewing angles, the mode selecting module 124 could obtain depth range and depth variation of the scene based on a disparity between the two images to dynamically select a mode to produce an output image in the follow-up steps.

First, the mode selecting module 124 determines whether the depth range is greater than a distance threshold or the depth variation is less than a first depth variation threshold (Step S304). If yes, the mode selecting module 124 would select the mono image-based mode to produce the output image (Step S306). To be specific, when the object distance of a target object is far (e.g. greater than 3 m) or the depth variation is small (a planar scene with depth variation less than, for example, 10 pixels), the difference between the images captured by the two lens is not significant. In such scenario, the mode selecting module 124 would select the mono image-based mode in which the mono image with more details is set as a primary image and the color image is set as a supplementary image. The image processing module 126 would produce the output image based on the processing approach set in such mode. In the present embodiment, the image processing module 126 may combine color image data of the color image into the mono image. The image processing module 126 may set pixels in the mono image (referred to as "luma pixels" hereinafter) as references, search for the corresponding pixels from the color image (referred to as "related color pixels"), and combine the pixel data of each correspondence. For example, the image processing module 126 may combine related color data of the related color pixels into luma data of the luma pixels to produce a color image with rich details. It should be noted that, the aforesaid image combination approach is only for illustrative purposes. The disclosure is not limited to any particular image combination approach.

On the other hand, when the mode selecting module 124 determines that the depth range is not greater than the distance threshold and the depth variation is not less than the first depth variation threshold in Step S304, the mode selecting module 124 further determines whether the depth variation is less than a second depth variation threshold (Step S308). If so, the mode selecting module 124 would select the color image-based mode to produce the output image (Step S310). Herein the second depth variation is greater than the first depth variation and may be, for example, 20 pixels. To be specific, when there exists certain level of depth variation in a scene, some regions appearing in the mono image could be occluded in the color image. In other words, no region and color data corresponding to certain regions in the mono image could be found from the color image. In such scenario, the mode selecting module 124 would select the color image-based mode in which the color image is set as a primary image and the mono image is set as a supplementary image. The image processing module 126 would produce the output image based on the processing approach set in such mode. In the present embodiment, the image processing module 126 may combine mono image data of the mono image into the color image. The image processing module 126 may set pixels in the color image (referred to as "color pixels" hereinafter) as references, search for the corresponding pixels from the mono image (referred to as "related luma pixels"), and combine the pixel data of each correspondence. For example, the image processing module 126 may combine related luma data of the related luma pixels into color data of the color pixels to produce a color image with a certain level of details.

However, when the mode selecting module 124 determines that the depth variation is not less than the second depth variation threshold in Step S308, the mode selecting module 124 would select the color image-only mode to produce the output image (Step S312). That is, when the depth variation exceeds a tolerable range, the probability of getting occluded regions could be higher and the area thereof could be larger. Hence, image combination may potentially cause discontinuities in such regions. In such scenario, the mode selecting module 124 would generate the output image by only using the color image data.

The proposed hybrid image processing method of an image capturing device could be illustrated as a functional flowchart according to an embodiment of the disclosure.

Figure 4:
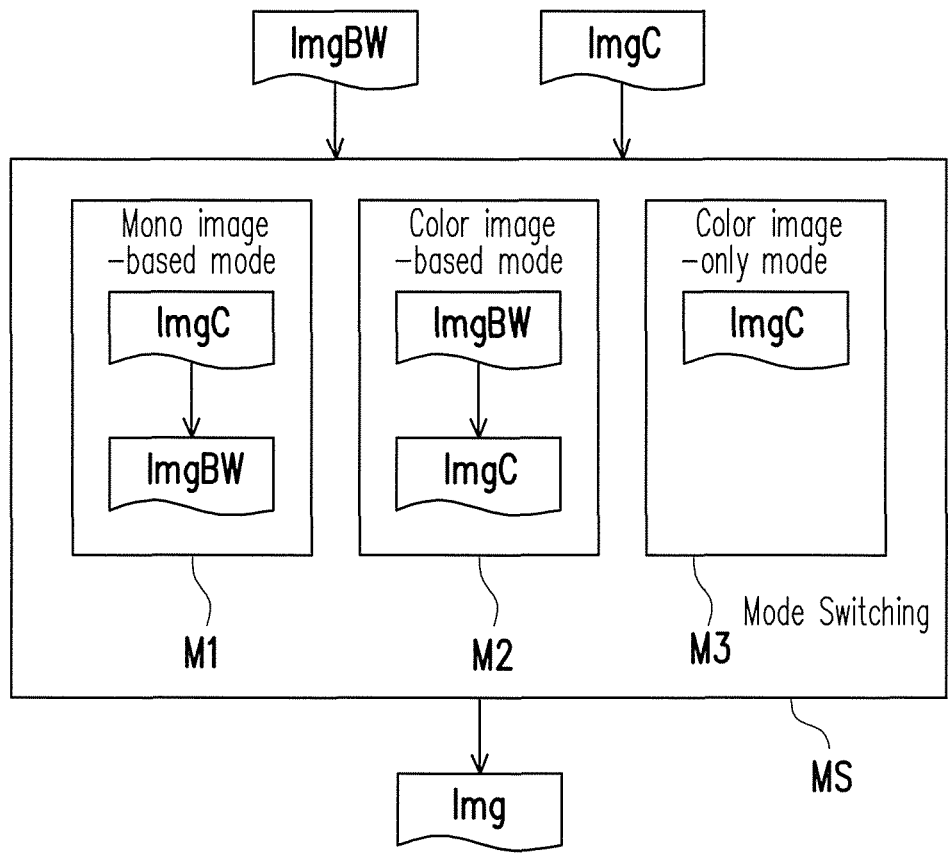
FIG. 4 illustrates a functional flowchart of a hybrid image processing method of an image capturing device according to an embodiment of the disclosure.

Referring to FIG. 1 and FIG. 4, in the proposed method, the image capturing device 122 of the image capturing device 100 captures a scene by using the first lens 10a and the second lens 10b so as to respectively generate a mono image ImgBW and a color image ImgC. Next, the mode selecting module 124 performs mode switching MS according to the mono image ImgBW and the color image ImgC so as to switch to one of a mono image-based mode M1, a color image-based mode M2, and a color image-only mode M3 dynamically. The mono image-based mode M1 is to set the mono image ImgBW as a primary image and the color image ImgC as a supplementary image and to add color image data of the color image ImgC onto the mono image ImgBW. The color image-based mode M2 is to set the color image ImgC as a primary image and the mono image ImgBW as a supplementary image and to add mono image data of the mono image ImgBW onto the color image ImgC. The color-only mode M3 is to only process or directly output the color image ImgC. The image processing module 126 would generate an output image Img according to the mode selected by the mode selecting module 124.

In view of the foregoing, in the proposed image capturing device and the hybrid image processing method thereof, dual lenses are used for capturing a mono image and a color image of a scene. An output image is generated by dynamically switching between the mono image-based mode, the color image-based mode, and the color image-only mode. Based on the advantages of a mono image and a color image in different scenes, the disclosure would adaptively switch to an image processing mode suitable for the current scene, which not only provide output images with high quality but also accentuate the slimness of the image capturing device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hybrid image processing method of an image capturing device having a first lens and a second lens comprising:
    capturing a scene by using the first lens and the second lens so as to respectively generate a mono image and a color image of the scene; and
    selecting one of a mono image-based mode, a color image-based mode, and a color image-only mode dynamically according to a content of the scene so as to generate an output image, wherein the mono image-based mode is to produce the output image by adding color image data of the color image onto the mono image, the color image-based mode is to produce the output image by adding mono image data of the mono image onto the color image, and the color image-only mode is to produce the output image by only using the color image.

2. The method according to claim 1, wherein the step of selecting one of the mono image-based mode, the color image-based mode, and the color image-only mode dynamically according to the content of the scene comprises:
    obtaining depth range and depth variation of the scene according to the mono image and the color image; and
    selecting one of the mono image-based mode, the color image-based mode, and the color image-only mode dynamically according to at least one of the depth range and the depth variation.

3. The method according to claim 2, wherein the step of selecting one of the mono image-based mode, the color image-based mode, and the color image-only mode dynamically according to at least one of the depth range and the depth variation comprises:
    determining whether the depth range is greater than a distance threshold or the depth variation is less than a first depth variation threshold; and
    when the depth range is greater than the distance threshold or the depth variation is less than the first depth variation threshold, selecting the mono image-based mode.

4. The method according to claim 3, wherein the step of selecting one of the mono image-based mode, the color image-based mode, and the color image-only mode dynamically according to at least one of the depth range and the depth variation comprises:
    when the depth range is not greater than the distance threshold and the depth variation is not less than the first depth variation threshold, determining whether the depth variation is less than a second depth variation threshold, wherein the second depth variation threshold is greater than the first depth variation threshold; and
    when the depth variation is less than the second depth variation threshold, selecting the color image-based mode.

5. The method according to claim 4, wherein the step of selecting one of the mono image-based mode, the color image-based mode, and the color image-only mode dynamically according to at least one of the depth range and the depth variation comprises:
    when the depth variation is not less than the second depth variation threshold, selecting the color image-only mode.

6. The method according to claim 1, wherein the step of adding the color image data of the color image onto the mono image comprises:
    searching for a plurality of related color pixels from the color image, wherein the related color pixels are associated with luma pixels in the mono image; and
    combining related color data of the related color pixels into luma data of the luma pixels.

7. The method according to claim 1, wherein the step of adding the mono image data onto the color image comprises:
    searching for a plurality of related luma pixels from the mono image, wherein the related luma pixels are associated with color pixels in the color image; and
    combining related luma data of the related luma pixels into color data of the color pixels.

8. An image capturing device comprising:
    a first lens;
    a second lens;
    a storage unit, coupled to the first lens and the second lens and storing images captured by the first lens and the second lens; and
    at least one processing unit, coupled to the first lens, the second lens, and the storage unit and comprising a plurality of modules, wherein the modules comprise:
        an image capturing module, capturing a scene by using the first lens and the second lens so as to respectively generate a mono image and a color image of the scene;

a mode selecting module, selecting one of a mono image-based mode, a color image-based mode, and a color image-only mode dynamically according to a content of the scene; and an image processing module, generating an output image according to a mode selected by the mode selecting module, wherein the mono image-based mode is to produce the output image by adding color image data of the color image onto the mono image, the color image-based mode is to produce the output image by adding mono image data of the mono image onto the color image, and the color image-only mode is to produce the output image by only using the color image.

9. The image capturing device according to claim 8, wherein the mode selecting module obtains depth range and depth variation of the scene according to the mono image and the color image and selects one of the mono image-based mode, the color image-based mode, and the color image-only mode dynamically according to at least one of the depth range and the depth variation.

10. The image capturing device according to claim 8, wherein the mode selecting module determines whether the depth range is greater than a distance threshold or the depth variation is less than a first depth variation threshold, and if yes, the mode selecting module selects the mono image-based mode.

11. The image capturing device according to claim 10, wherein when the depth range is not greater than the distance threshold and the depth variation is not less than the first depth variation threshold, the mode selecting module determines whether the depth variation is less than a second depth variation threshold, wherein the second depth variation threshold is greater than the first depth variation threshold, and if yes, the mode selecting module selects the color image-based mode.

12. The image capturing device according to claim 11, wherein when the depth variation is not less than the second depth variation threshold, the mode selecting module selects the color image-only mode.

13. The image capturing device according to claim 8, wherein when the mode selecting module selects the mono image-based mode, the image processing module searches for a plurality of related color pixels from the color image and combines related color data of the related color pixels into luma data of the luma pixels, wherein the related color pixels are associated with luma pixels in the mono image.

14. The image capturing device according to claim 8, wherein when the mode selecting module selects the color image-based mode, the image processing module searches for a plurality of related luma pixels from the mono image and combines related luma data of the related luma pixels into color data of the color pixels, wherein the related luma pixels are associated with color pixels in the color image.

* * * * *